UNITED STATES PATENT OFFICE.

HUGO WOLLHEIM, OF LONDON, ENGLAND.

METHOD OF DISINFECTING SEWAGE.

SPECIFICATION forming part of Letters Patent No. 486,172, dated November 15, 1892.

Application filed September 16, 1889. Serial No. 324,136. (No specimens.) Patented in England October 24, 1888, No. 15,321; in France April 13, 1889, No. 197,440; in Belgium May 3, 1889, No. 86,091, and in Canada June 6, 1889, No. 31,508.

*To all whom it may concern:*

Be it known that I, HUGO WOLLHEIM, a citizen of the United States, residing at London, England, have invented Improved Means for Clarifying, Purifying, Disinfecting, and Utilizing Sewage and other Foul or Waste Waters, (which has been patented to me in England, No. 15,321, dated October 24, 1888; in France, No. 197,440, dated April 13, 1889; in Belgium, No. 86,091, dated May 3, 1889, and in Canada, No. 31,508, dated June 6, 1889,) of which the following is a specification.

My invention relates to the treatment of sewage or other foul or waste waters for their clarification, purification, and disinfection and the utilization of the resulting matters; and it consists in the treatment of the said sewage or other foul or waste waters by milk of lime (or other alkalies with a similar reaction) and trimethylamine or isomers thereof, or salts or combinations of the same, such as the hydrochlorate, phosphate, or lactate, or compounds containing such.

The effect of the treatment is, first, the complete clarification and partial purification of the sewage by the precipitation of the solid matters in suspension and a portion of those in solution; second, the absolute disinfection by the extirpation—*i. e.*, the absolute destruction of the vitality—of all the germs and their spores, which if undestroyed would be capable of inducing thereafter chemical change or disease; third, the production of a precipitate or sludge which can be pressed into cakes or further dried or powdered by air or heat or to be otherwise manipulated and which by suitable treatment may be made to yield various products of agricultural or commercial value, or which may be also utilized as a precipitate for further quantities of sewage. The clarified, purified, and disinfected liquid (effluent) produced by this process is clear and bright and free from offensive odor and deleterious matter. It is also free from liability to putrefactive change thereafter, even at high temperatures, and consequently admissible into open watercourses without risk of nuisance or danger to the health, and may be advantageously applied for irrigation.

I carry out my process in the following manner: For the clarification and purification of the sewage, for instance, I prefer to use lime in the condition of milk of lime, varying in strength according to the degree of clarification which is required in each particular case. The maximum of clarification which can be reached in the treatment of ordinary fresh town-sewage, for instance, I have found to be obtainable by adding to such sewage and thoroughly mixing therewith the milk of lime in such proportion that about one gram of quicklime is added to every liter of sewage. I do not claim particular novelty for this said clarification and partial purification of the sewage or other liquid treated, but the absolute disinfection, which is the essential part of my process and which is accomplished as follows:

Before applying to the sewage or other liquid the milk of lime, as above stated, I introduce into the said milk of lime when it is freshly prepared trimethylamine or an isomer, preferably in the form of a salt or combination of the same, such as the hydrochlorate, phosphate, or lactate, or a compound containing such, in proportions as hereinafter stated. This mixture of milk of lime and trimethylamine I have found to be capable in the proportions hereinafter specified of destroying in a remarkably-short space of time every species of micro-organism occurring in the sewage and other foul or waste waters. The said mixture of milk of lime and trimethylamine is therefore a true and most powerful disinfectant, and it has great advantages over other powerful disinfectants in that it is non-poisonous and comparatively cheap—that is to say, I may use pure trimethylamine when applied to small volumes of waste, such as from isolated dwellings, chemical and other factories; but in the case of large volumes—such as the sewage of towns—I may use a cheaper form. For the proper composition of the said mixture I add the said trimethylamine or isomers thereof, preferably in the form of salts or combinations of the same, as before specified, or compounds containing such, in the proportions of about one-fourth ($\frac{1}{4}$) of a gram of trimethylamine (calculated as pure) to every such volume of the milk of lime as is intended for the treatment of about one thousand liters of ordinary fresh town-sewage, as such a charge of trimethylamine I have generally found sufficient for the production of a thorough disinfection. Thus by adding to the sewage or other foul or waste waters and thoroughly intermixing therewith a suitable quantity (varying, of course, with the nature of the liquid to be treated) of the mixture formed as above described such liquid is clarified and partly purified and absolutely disinfected. When the precipitated solid matter is sufficiently settled to leave a perfectly clear and bright supernatant liquid, (effluent,) the latter can be drawn off for discharge or utilization, as the case may be, and the sediment or sludge can be removed for pressing and powdering or such manipulation as may be desired.

Having now particularly described my invention, what I claim is—

The herein-described method of clarifying, purifying, and sterilizing sewage and other waste waters, consisting in treating the same with a prepared mixture of milk of lime and trimethylamine, in the proportions substantially as specified.

In testimony whereof I have signed my name to this specification in the presence of two subscribing witnesses.

HUGO WOLLHEIM.

Witnesses:
RICHARD A. HOFFMANN,
ALBERT E. NASH.